United States Patent
Meyer et al.

(10) Patent No.: US 10,821,648 B2
(45) Date of Patent: Nov. 3, 2020

(54) HEATING DEVICE FOR THERMALLY CONDITIONING PREFORMS FOR BLOW MOLDING

(71) Applicant: KHS CORPOPLAST GMBH, Hamburg (DE)

(72) Inventors: Niels Meyer, Schenefeld (DE); Frank Lewin, Tangstedt (DE); Deniz Ulutürk, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 162 days.

(21) Appl. No.: 16/075,810

(22) PCT Filed: Feb. 14, 2017

(86) PCT No.: PCT/EP2017/053251
§ 371 (c)(1),
(2) Date: Aug. 6, 2018

(87) PCT Pub. No.: WO2017/140660
PCT Pub. Date: Aug. 24, 2017

(65) Prior Publication Data
US 2019/0047206 A1 Feb. 14, 2019

(30) Foreign Application Priority Data
Feb. 15, 2016 (DE) .................. 10 2016 001 630

(51) Int. Cl.
*B29C 49/64* (2006.01)
*B29C 49/42* (2006.01)
(Continued)

(52) U.S. Cl.
CPC ...... *B29C 49/6409* (2013.01); *B29C 49/4205* (2013.01); *B29C 49/06* (2013.01); *B29L 2031/7158* (2013.01)

(58) Field of Classification Search
CPC ............ B29C 49/4205; B29C 49/4215; B29C 2049/4226; B29C 49/6409; B29C 49/6418; B29C 49/68
See application file for complete search history.

(56) References Cited

U.S. PATENT DOCUMENTS 5,066,222 A 11/1991 Roos et al.
5,920,677 A 7/1999 Emmer et al.
(Continued)

FOREIGN PATENT DOCUMENTS

AT 000520 U1 12/1995
CA 2950394 A1 * 12/2015 ......... B29C 49/4205
(Continued)

*Primary Examiner* — Robert B Davis
(74) *Attorney, Agent, or Firm* — Rankin, Hill & Clark LLP

(57) ABSTRACT

The invention relates to a heating device (H) comprising a heating section (24) for thermally conditioning preforms (1) consisting of thermoplastic material, comprising an upper orifice portion (21) having an opening, a collar-like support ring (54) arranged below the orifice portion (21), and a bottom portion (56) closed at the lower end, to a temperature profile suitable for blowmolding, wherein the heating device (H) has transportation means (33) for the transportation of the preforms (1) along a transportation path (55) of the heating device (H), and wherein the transportation means (33) each bear at least one handling means (41) for holding and handling the preforms (1), wherein a radiation screen (52), which follows the transportation path of the preforms (1), and which has a recess (53) at least on one end face to partially enclose a preform (1) held in the handling means (41) adjoining the recess (53), is provided in an intermediate space between two handling means (41) each provided for handling a preform (1), wherein the radiation screen (52) is arranged such that a surface region of the radiation screen (52), viewed in the longitudinal direction of the preform (1), (Continued)

Figure 1:
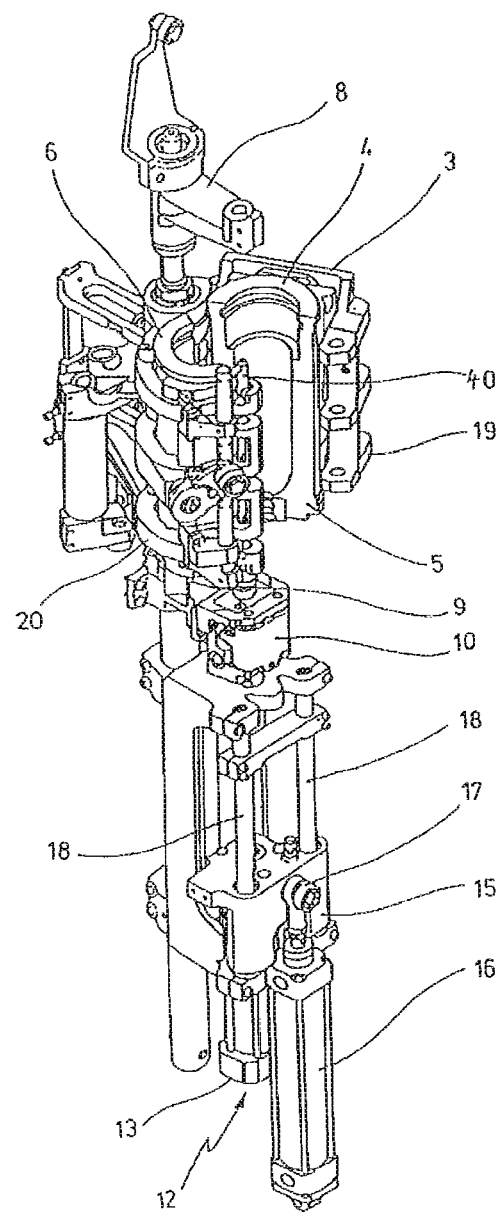

at least temporarily overlaps on its side facing away with the orifice portion (21) with a surface region of the support ring (54) during the transportation of the preforms (1).

14 Claims, 12 Drawing Sheets

(51) Int. Cl.
  *B29L 31/00* (2006.01)
  *B29C 49/06* (2006.01)

(56) References Cited

U.S. PATENT DOCUMENTS

| | | | |
|---|---|---|---|
| 7,121,821 | B2 | 10/2006 | Pickel |
| 8,939,746 | B2 * | 1/2015 | Blochmann ............. B29C 49/42 |
| | | | 198/867.11 |
| 2004/0161486 | A1 | 8/2004 | Pickel |
| 2009/0061041 | A1 * | 3/2009 | Kiefl ................... B29C 49/4205 |
| | | | 425/534 |
| 2010/0196632 | A1 | 8/2010 | Eble |
| 2013/0015040 | A1 | 1/2013 | Leroux et al. |

FOREIGN PATENT DOCUMENTS

| | | |
|---|---|---|
| CN | 201645806 U | 11/2010 |
| DE | 2352926 A1 | 4/1975 |
| DE | 1212583 A1 | 10/1993 |
| DE | 1340291 A1 | 6/1995 |
| DE | 19906438 A1 | 8/2000 |
| DE | 20311657 U1 | 9/2004 |
| DE | 102010064545 A1 | 1/2014 |
| DE | 102013109174 A1 * | 2/2015 ............ B29C 49/68 |
| DE | 102014017546 A1 | 6/2016 |
| DE | 102015005358 A1 | 11/2016 |
| EP | 2799210 A1 | 11/2014 |
| FR | 2950283 A1 | 3/2011 |
| FR | 2950284 A1 | 3/2011 |
| JP | H10113978 A | 5/1998 |
| JP | H11508834 A | 8/1999 |

* cited by examiner

HEATING DEVICE FOR THERMALLY CONDITIONING PREFORMS FOR BLOW MOLDING

The invention relates to a heating device for thermally conditioning preforms provided for blowmolding and a blowmolding machine.

In the case of container molding by blowing pressure action, preforms made of a thermoplastic material, for example, preforms made of PET (polyethylene terephthalate) are supplied to different processing stations within a blowmolding machine, i.e., within a device for the blowmolding production of finished containers from preforms. Such a blowmolding machine or blowing machine typically has a heating device and a blowing unit, in the region of which the preform, which was previously temperature controlled in the heating device, is expanded into a container by biaxial orientation. The expansion takes place, for example, with the aid of compressed air, which is introduced into the preform to be expanded. The method sequence during such an expansion of the preform is explained in DE 4340291 A1.

The introduction of the pressurized gas also comprises the pressurized gas introduction into the developing container bubble and the pressurized gas introduction into the preform at the beginning of the blowmolding procedure or blowing procedure. Other fluids are also usable for blowmolding, in particular also the use of the filling product to be decanted into the container. The following general description nonetheless takes place on the example of a blowmolding machine operating using pressurized gas, without the invention being restricted to such blowmolding machines.

The fundamental structure of a blowing station for container molding is described in DE 4212583 A1. Possibilities for temperature conditioning of the preforms are explained in DE 2352926 A1. Reference is explicitly made to the cited documents and a further description of blowing stations and temperature conditioning is thus superfluous.

Within the device for blowmolding, the preforms and the inflated containers can be transported with the aid of different transportation and handling units. For example, the use of transportation mandrels, on which the preforms are held for transportation, is known. The preforms can also be handled and transported using other carrying units, however. The use of gripping tongs for handling and for transporting preforms and the use of clamping mandrels, which are insertable into an orifice region of the preform to hold them, are also among the available designs.

Transportation and handling of containers and preforms using transfer wheels is described, for example, in DE 19906438 A1, in the case of an arrangement of a transfer wheel between a blowing wheel and an output section and a further transfer wheel between the heating section and the blowing wheel.

The above-explained handling of the preforms takes place, on the one hand, in the so-called two-step method, in which the preforms are firstly produced in an injection molding method, subsequently temporarily stored, and only later conditioned with respect to the temperature thereof and inflated to form a container. On the other hand, a use takes place in the so-called one step method, in which the preforms are suitably temperature controlled immediately after the production thereof by injection molding and sufficient solidification and are subsequently inflated.

Different embodiments are known with respect to the blowing stations used. In the case of blowing stations which are arranged on rotating transportation wheels, namely on a so-called blowing wheel, a book-like unfolding ability of the mold carriers is frequently to be encountered. However, it is also possible to use mold carriers which are displaceable in relation to one another or guided in another manner. In the case of fixed blowing stations, which are suitable in particular for the purpose of accommodating multiple cavities for the container molding, plates arranged parallel to one another are typically used as the mold carriers.

Before carrying out the heating, the preforms are typically put onto transportation mandrels, which either transport the preform through the entire blowing machine or which merely circulate in the region of the heating device. In the case of an upright heating of the preforms such that the orifices of the preforms are oriented downward in the vertical direction, the preforms are typically put onto a sleeve-shaped holding element of the transportation mandrel. In the case of a suspended heating of the preforms, in which they are oriented with the orifices thereof in the vertical direction upward, spreading mandrels are generally inserted into the orifices of the preforms, which fixedly clamp the preforms. Both active controllable clamping elements and also passive clamping elements are known from the prior art. Passive clamping elements cause clamping, for example, as a result of an active spring force, against which the preforms can be put onto the transportation mandrel or against which the preforms can be removed from the transportation mandrel, while in the case of the active transportation mandrels, an actuation has to be performed, for example, by an actuator or, for example, by an external curve controller, which triggers the clamping mechanism or cancels out the clamping engagement again, respectively.

To shorten the required heating time, using NIR radiators in the region of the heating section is known, the heating radiation of which is emitted in a near infrared range, typically having wavelengths between 0.4 and 1 μm. The heating of the preforms primarily takes place in this case by radiation absorption during the passage of the NIR radiation through the preform material. To optimize the energy yield, such heating sections are equipped with a plurality of mirror surfaces, to as much as possible avoid or at least strongly reduce absorption of the thermal radiation by components of the heating section, and in order to reflect the NIR radiation onto the preform for heating again.

The heating sections are typically formed at least in regions like tunnels, and are delimited for this purpose, for example, on one side by the housing of a holder for the heating elements and on the opposing side by a reflector opposite to this housing, referred to hereafter as the counter reflector. In the vertical direction, a delimitation can be produced by a bottom and/or a cover, depending on whether the preforms are transported through the heating section with the orifices thereof oriented in the vertical direction upward or downward. These vertical delimitations can also be formed as reflectors. Moreover, it is typical to protect the orifice region of the preform against heating radiation, for example, with the aid of accompanying reflectors, referred to hereafter as orifice reflectors, since this region is already produced in its finished form and is not to experience further deformation during the blowmolding.

One process step of great significance in the blowmolding of containers is the formation of a defined temperature profile during the heating procedure preceding the biaxial expansion of the container. The essential process parameters for the biaxial elongation of the preform carried out in the blowing station are determined on the basis of the temperature profile introduced into the wall material of the preform during the heating process. For example, the maximum speed of a stretching rod inserted into the preform and the maximum expansion speed of the container bubble during the pressure application to the preform are determined by the temperature profile. Higher speeds result in greater throughput rates and thus an increase of efficiency of the blowmolding machine.

To enable high speeds during the blowmolding, the formation of a particularly well-defined temperature profile is necessary. To reduce discards due to incorrectly expanded preforms, a consistent quality of the temperature profile is desired. Efforts are thus being made to produce the most uniform possible, well-defined temperature profile during the heating of the preforms.

A high throughput of preforms through a heating device upstream of the blowing station results in a high power demand, so that sufficient thermal energy can be introduced into the preform body in a short time. The power demand is unnecessarily increased due to heat losses during the heating process. Losses of thermal energy arise, for example, due to absorption of thermal radiation on components of the heating device or due to radiation loss through technically-required openings in the heating device to the surroundings. Efforts are being made to keep the energy consumption as low as possible.

Noticeable heat losses in the region of the heating device arise in particular due to the escape of thermal radiation through gaps between the preforms carried on the transportation mandrels. To solve this problem, perforated screens which partially close the gaps are typically used, wherein the preforms are accommodated by the borehole of the perforated screens and are held in a position plunged into the perforated screen during the transportation along the heating section. Such solutions are known, for example, from DE 10 2010 064 545 A1 or DE 10 2015 005 358 A1.

The object of the present invention is to provide a heating device and a blowmolding machine of the type mentioned at the outset for producing an improved temperature profile while simultaneously improving the heating device efficiency.

This object is achieved by a heating device having the features disclosed and claimed herein and a blowmolding machine having the features disclosed and claimed herein. Advantageous embodiments are specified in the dependent claims.

A heating device according to the invention has a heating section for the thermal conditioning of preforms consisting of thermoplastic material comprising an upper orifice portion having an opening, a collar-like support ring arranged below the orifice portion, and a bottom section closed at the lower end, to a temperature profile suitable for blowmolding, wherein the heating device has transportation means for the transportation of the preforms along a transportation path of the heating device, and wherein the transportation means each bear at least one handling means for holding and handling the preforms, wherein, in an intermediate space between two handling means each provided for handling a preform, a radiation screen following the transportation path of the preforms in a positively guided manner is arranged, which has a recess for partially enclosing a preform held in the handling means adjoining the recess at least on one end face, and wherein the radiation screen is arranged such that a surface region of the radiation screen, viewed in the longitudinal direction of the preform, overlaps on its side facing away from the orifice portion with a surface region of the support ring at least temporarily during the transportation of the preforms.

Due to an overlap of the radiation screen with the support ring, the support ring and the orifice portion arranged above the support ring can be shielded from undesired heating due to the thermal radiation acting to form the temperature profile on the preform body.

In conventional conveyor chains for the transportation of the preforms along the transportation path through a heating device, each chain link has a transportation mandrel for accommodating a preform. In the known conveyor chains, a perforated screen having central borehole is arranged on the transportation mandrel, wherein the preforms are accommodated using the transportation mandrel through the borehole for the loading and are put down for the unloading. The support ring is located in this case at the height of the borehole, in order to form the smallest possible gap for heat losses. Nonetheless, a substantial part of the thermal radiation, which cannot be used for generating the temperature profile, escapes through the gap between support ring and borehole from a radiation space below the support ring. Moreover, the support ring and the orifice region above the support ring are unintentionally heated by the conventional construction, which can result in a later deformation of these regions.

With the proposed solution, on the one hand, undesired heating of the orifice region can the avoided and, moreover, a well-defined temperature profile can be generated above the support ring, which improves the controlled material withdrawal during the subsequent stretch blowing step.

A further advantage of the arrangement according to the invention of the radiation screens is that a preform which slips off unintentionally from a handling means or from a transportation mandrel cannot fall into the heating chamber. During the transportation through the heating chamber or the heating section of the heating device, the radiation screens engage below the preforms below the support ring, whereby slipping through and falling down is prevented. Heretofore, preforms which slipped off due to malfunction or due to material flaws fell down into the heating box and melted on the bottom of the heating box. This possibly required stopping of the facility and a complex cleaning process.

In one preferred embodiment, it is conceived that the handling means are designed as transportation mandrels, on which the preforms are preferably transported suspended. In particular, it is conceived that the handling means or the transportation mandrels each have a carrying head, using which a preform can be fixed in its orifice region. The carrying head, which is arranged in particular in the vertical direction in the lower end region of the transportation mandrel, is preferably formed such that it engages into the orifice opening of the preform and fixes the preform in a clamping manner to hold the preform. To load and unload a preform, it is conceived that the transportation mandrel is mounted so it is axially displaceable along a longitudinal axis of the preform or along a longitudinal axis of the transportation means. In one particularly preferred variant, it is conceived that the transportation mandrel is axially displaceable in the direction transverse to the transportation direction of the preforms or transverse to a movement path of the transportation means.

For loading a preform on a handling means, in particular on a handling means designed as a transportation mandrel, it can be provided that the preform is transferred to the handling means by a transfer device arranged externally to the transportation means in the axial direction along a longitudinal axis of the preform or in the direction transverse to the transportation direction of the preforms or transverse to the movement direction of the transportation means. It can preferably alternatively or additionally be provided that the handling means, which is designed in particular as a transportation mandrel, displaces a carrying head out of an idle position in the axial direction, in particular axially downward, to accept a preform for loading from a transfer device. In the case of an active movement of the handling means, it is conceived that after receiving of the preform, the carrying head holding the preform is displaced in the reverse axial direction, in particular axially upward, into a transportation position.

A correspondingly reverse movement sequence is conceived for the unloading of a preform from a handling means. It can thus be provided in particular for unloading of a preform that the preform is removed from the handling means by a removal device arranged externally to the transportation means in the axial direction along a longitudinal axis of the preform or in the direction transverse to the transportation direction of the preforms or transverse to the movement direction of the transportation means. It can preferably alternatively or additionally also be provided for the unloading procedure that the handling means, which is designed in particular as a transportation mandrel, displaces a carrying head out of a transportation position in the axial direction, in particular axially downward, in order to transfer the preform held on the carrying head to a removal device for unloading. In the case of an active movement of the handling means, it is conceived that after a transfer of the preform, the empty carrying head is displaced in the reverse axial direction, in particular axially upward into an idle position.

For the loading and/or unloading of the preforms with an axial movement of the preform, in which the support ring of the preform is guided past the radiation screen according to the invention in the vertical direction, a collision-free displacement of the preform has to be ensured. Since it is provided according to the invention that a surface region of the radiation screen, viewed in the longitudinal direction of the preform, overlaps with a surface region of the support ring on its side facing away from the orifice portion at least temporarily during the transportation of the preforms, the overlapping surface region of the radiation screen has to be removed from the movement path of the support ring during the loading and/or unloading. As explained in greater detail hereafter, the radiation screen can be laterally pivoted away for this purpose, for example, and/or with a specific route guiding of the transportation means, an expanding gap is formed between two successively guided radiation screens, which ensures a free space for a collision-free displacement of the preform, in particular in the axial direction transverse to the pivot movement between preform and radiation screen, past the radiation screens.

Upon use of handling means and/or transportation mandrels having a carrying head protruding at least partially into the orifice opening of a preform, it can moreover be provided in one advantageous embodiment that the lower side or the end face of the carrying head region protruding into the orifice region of the preform is made reflective to thermal radiation. Additional shielding of the orifice region against overheating due to thermal radiation acting from the preform body side and radiating through the wall of the preform into the orifice region can thus be achieved. With a reflective lower side or end face of the carrying head, on the one hand, the orifice region is protected against undesired heating and, on the other hand, the energy efficiency of the heating device can be increased, since more thermal radiation can be kept in the heating region. The lower side or the end face of the carrying head can have, for example, a polished metal surface, a ceramic reflecting thermal radiation, or other materials or elements known from the prior art for the reflection of thermal radiation. In particular, it can be provided that the reflection surface is formed such that the thermal radiation incident from below the support ring of the preform is reflected back in predetermined directions.

In the heating device according to the invention, it is conceived that the heating section consists of one or of multiple heating portions, wherein each portion consists of a single one or multiple heating devices arranged in succession in the transportation direction, so-called heating boxes. The transportation means are preferably chain links, which are linked to one another in a pivotable manner by means of an axis of rotation to form a conveyor chain.

In one variant, it is conceived that the handling means are formed as transportation mandrels, wherein the transportation means are linked to one another in a pivotable manner like chain links to form a conveyor chain. In a first embodiment, it can furthermore be provided that each directly successive transportation mandrel of the conveyor chain is used for handling one preform. Alternatively, it is conceivable that between two transportation mandrels provided for the handling, one or more than one chain link is or are used as an empty link to provide a sufficiently wide gap. It is also conceivable in this embodiment to provide one or more than one transportation mandrel as an empty mandrel between two transportation mandrels provided for the handling, wherein one of the empty mandrels can be used as a holder for a radiation screen according to the invention. This alternative embodiment comes into consideration, for example, if the preforms transported on the conveyor chain are each wider than a transportation mandrel provided for handling a preform.

Each radiation screen preferably has two recesses, which are each designed to enclose a preform. In an alternative embodiment, it can be provided that more than one radiation screen is arranged in the intermediate space between two preforms, wherein each radiation screen adjoining a preform has a recess for partially enclosing a preform. The recesses can in particular be adapted to the circumferential shape or the radius of the preform, preferably adapted to the circumferential shape or the radius of the preform in the region directly below the support ring, i.e., on the side of the support ring facing away from the orifice portion.

Constructive details of the present heating device, in particular on the structure and the function of transportation and handling means according to the invention, can be embodied as set forth in DE 10 2015 005 358.2 and DE 10 2014 017 546.4. Reference is expressly made to these documents for this purpose.

In particular upon the use of conventional transportation mandrels as handling means, using which preforms can be accommodated in a holding position or discharged in a discharge position with the orifice portion and the support ring past the radiation screen for loading and unloading, it is conceived that the radiation screen is movable into an open position which laterally releases the support ring and a closed position which engages below the support ring.

In the heating device according to the invention, it is provided that a surface region of a radiation screen overlaps with the support ring. The gap dimension between radiation screens can therefore be kept very small, whereby significantly improved shielding of the radiation chamber of the heating section is achieved. A very steep temperature profile results at the gap between preform and radiation screen, whereby a very exactly defined withdrawal region for the biaxial stretching following the heating process results.

To enable undisturbed loading and unloading of the preforms, the radiation screens are movable into an open position and a closed position. In the closed position, overlap of a surface region of the radiation screen with a surface portion of the support ring exists on the side of the support ring facing toward the preform bottom. The radiation screen thus engages below the support ring. In the open position, the radiation screen is moved laterally away from the preform, and therefore the overlap of the support ring with the radiation screen is canceled out. In the open position of two radiation screens enclosing a preform, the loading and unloading can thus be carried out without collisions.

The radiation screens are preferably positively guided such that they enclose the preforms partially, i.e., over a circumferential section, at least temporarily or in portions during the transportation, for example, during the transportation through a heating section. In this case, it is conceived, for example, that the radiation screens assume a closed position during linear guiding of the transportation path and assume an open position during cornering. The open or closed position can be set by means of a curve controller.

A high level of flexibility in the setting of the temperature profile, in particular to adapt the temperature profile for various preform types or container shapes, can be achieved in that the radiation screen is designed as vertically adjustable. In this refinement, the distance between the surface of the radiation screen facing toward the preform body side, i.e., the radiation chamber for heating the preform, is changeable in relation to the support ring or the preform in the longitudinal direction of the preform. The withdrawal point created during the temperature control can thus be varied in the distance from the support ring.

A targeted selection of the materials and surface composition of the components coming into contact with thermal radiation can improve the efficiency of the heating device. It can be provided, for example, that the radiation screen has a surface reflecting the thermal radiation on the preform body side. It can be provided, for example, that the surface is polished. In one simple embodiment, the radiation screen can be produced from a metal. Alternatively or additionally, it can be provided that the radiation screen is coated using a layer which reflects thermal radiation.

To avoid excess heating and damage to the radiation screen possibly linked thereto, it can be provided that the heating device has a cooling unit, by means of which a cooling gas can be applied to the radiation screen.

Cooling air is preferably applied to the upper side, i.e., the surface of the radiation screen facing toward the orifice portion of the preform. The cooling prevents the undesired heating of the radiation screen.

In one possible embodiment, it can be provided that the radiation screen has two recesses for partially enclosing one preform each. It is conceived in this case that the radiation screen, at least temporarily during the transportation of the preforms, encloses a first preform carried on a first handling means using the first recess and encloses a second preform carried on a second handling means using the second recess.

The recesses are formed such that the preforms can be enclosed partially, i.e., in some regions. For efficient shielding of the orifice portion or the support ring arranged below the orifice portion, it is conceived that the recess encloses a preform over an angle range of 160° to 180°. The recess preferably encloses the preform over an angle range of 180°, i.e., by half, and therefore a radiation screen adjoining on the other side of the preform can cover the remaining angle range. A close enclosure of the preform and therefore the best possible shielding against thermal radiation used in the region of the preform body can thus be achieved.

In possible embodiments, it can be provided that the radiation screen is held on a handling means or a transportation means bearing a handling means. In a first variant, it is conceived that the radiation screens are each linked so they are pivotable on the transportation means in the transportation direction. It can be provided in this case that the pivot axis of the radiation screen and the chain link axis of two transportation means connected like chain links can be coincident.

It is also conceivable that the radiation screen is connected by means of two pivot axes to two transportation means which are directly adjacent in the transportation direction, wherein the radiation screen is linked using one pivot axis to each transportation means.

In the case of linkage of the radiation screens mounted by pivot joints on a chain-link axis of the transportation means, the radiation screen is thus disengaged from the preform, i.e., pivoted into an open position, as it traverses a curved path. The preform is released in this case and in this state a preform can be put down or picked up by the handling means, which is designed, for example, as a transportation mandrel, without the support ring colliding with the radiation screen.

Particularly good results with respect to the temperature conditioning of the preform may be achieved upon use of the radiation screen according to the invention in that the edge region on the preform body side of the recesses incorporated into the radiation screen has a chamfer, which has a changing slope over the course of the edge region. A slope of the chamfer angle which changes continuously over the course of the edge region can preferably be provided. It is provided in particular in this case that the chamfer angle, i.e., the angle in relation to the longitudinal axis of the preform, increases from an angle of greater steepness, i.e., from an angle less than 45° or less than 30°, to an angle of least steepness, i.e., an angle of greater than 45° or greater than 60°.

In this embodiment, the recess of the radiation screen thus has an asymmetrical chamfer profile.

It has resulted from experimental series of heating passes using radiation screens having recesses which have an asymmetrical chamfer profile that advantageous temperature gradients result in the region directly below the support ring due to a suitable asymmetrical slope profile. During the transportation of the preforms through the heating chamber of the heating device, the preforms are typically heated using thermal radiators arranged on one side of the heating chamber. If the edge region on the preform body side of the recesses enclosing the preforms has a steep chamfer angle on the side of the preform facing away from the thermal radiators, i.e., for example, an angle of less than 45° or less than 30° to the longitudinal axis of the preform, the chamfer surface, which is formed steep in this case, can advantageously be used as a reflection surface for the targeted heating of specific walled regions directly below the support ring. A flat chamfer angle of the edge region on the preform body side of the recess enclosing the preforms, i.e., an angle of greater than 45° or greater than 60° to the longitudinal axis of the preform, can be used on the side of the preform facing toward the thermal radiators, on the other hand, for a targeted transmission of otherwise masked thermal radiation, to intentionally condition the wall region of the preform directly below the support ring with respect to the temperature profile.

It is particularly advantageous with respect to the formation of a homogeneous temperature profile if the chamfer profiles of two opposing recesses which jointly enclose a preform from two sides are formed uniformly, and therefore a chamfer profile which continuously follows the common course of both edge regions is formed with respect to the slope change. It is apparent that the portions of the chamfer surface, in particular the regions of greater steepness provided for reflection of thermal radiation, can have a surface which reflects the thermal radiation particularly well or is mirrored or can have a corresponding surface treatment.

A blowmolding machine having a heating device according to the invention is also according to the invention. Advantages and designs of the blowmolding machine may be derived in accordance with the above-described embodiments of the heating device according to the invention.

Figure 2:
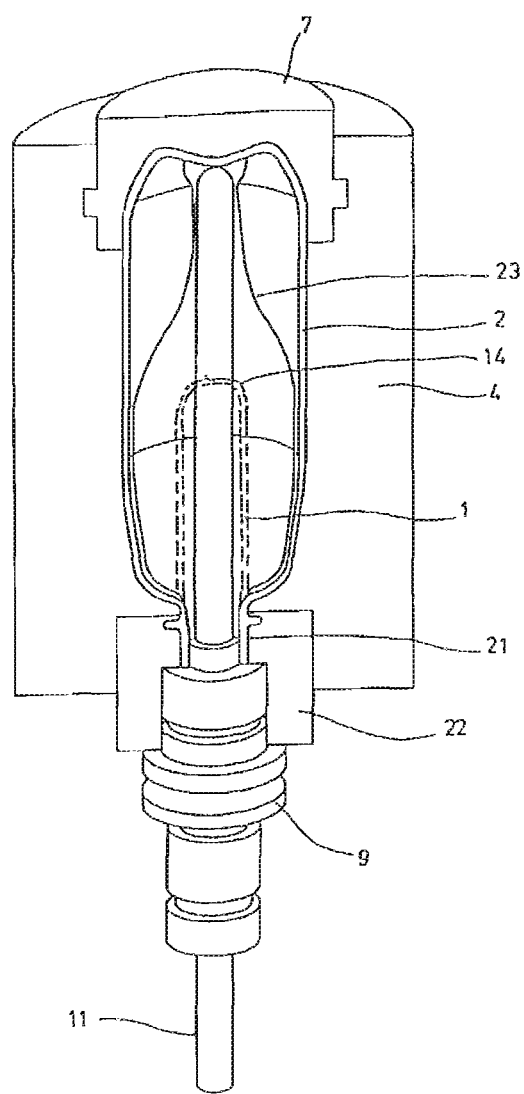
Figure 3:
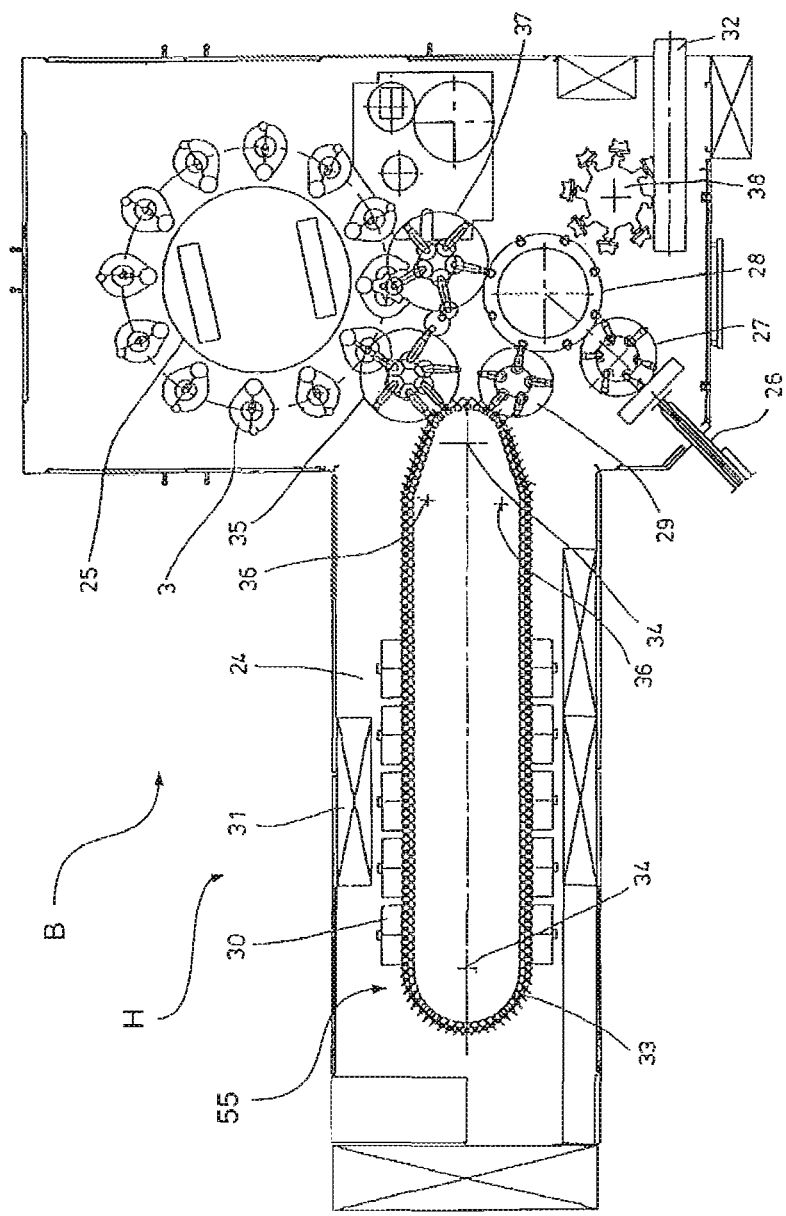
Figure 4:
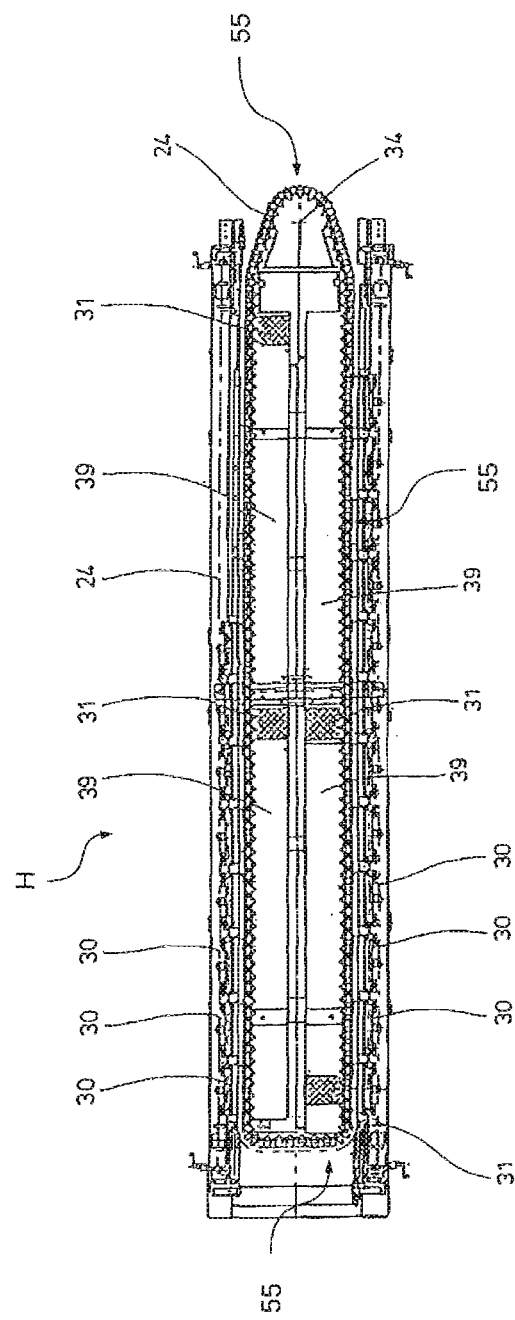
Figure 5:
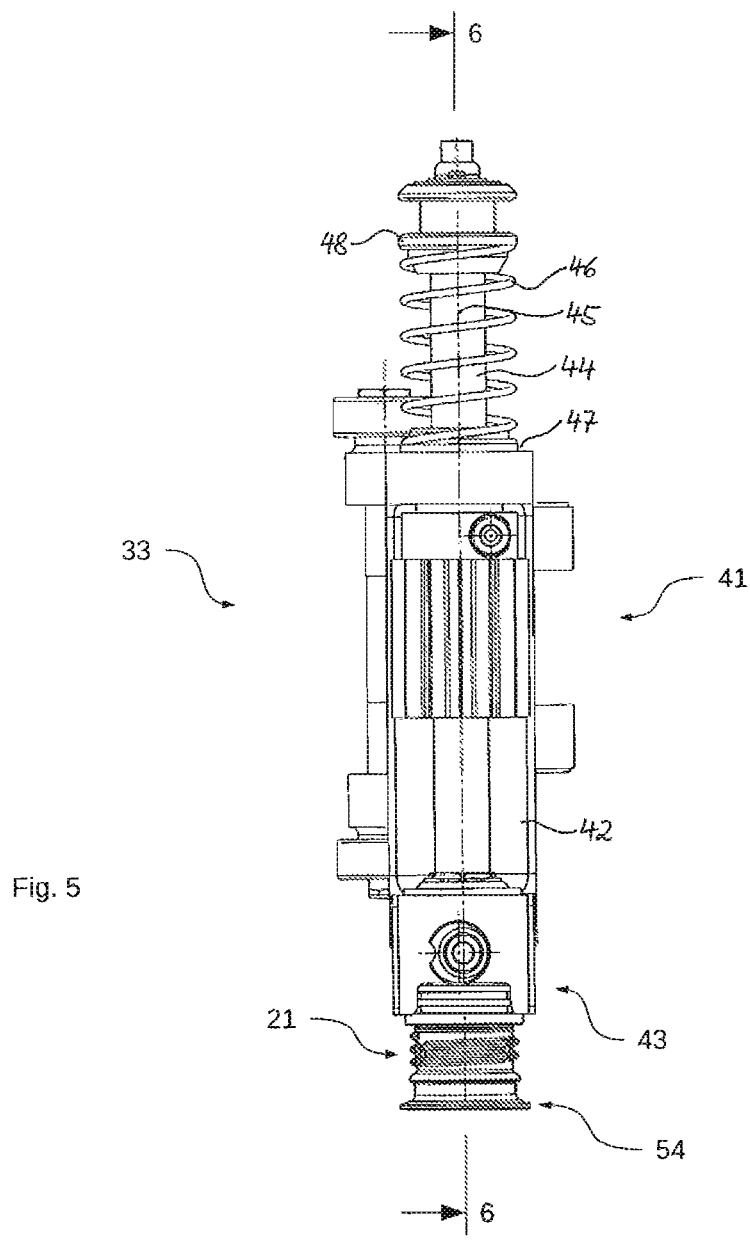
Figure 6:
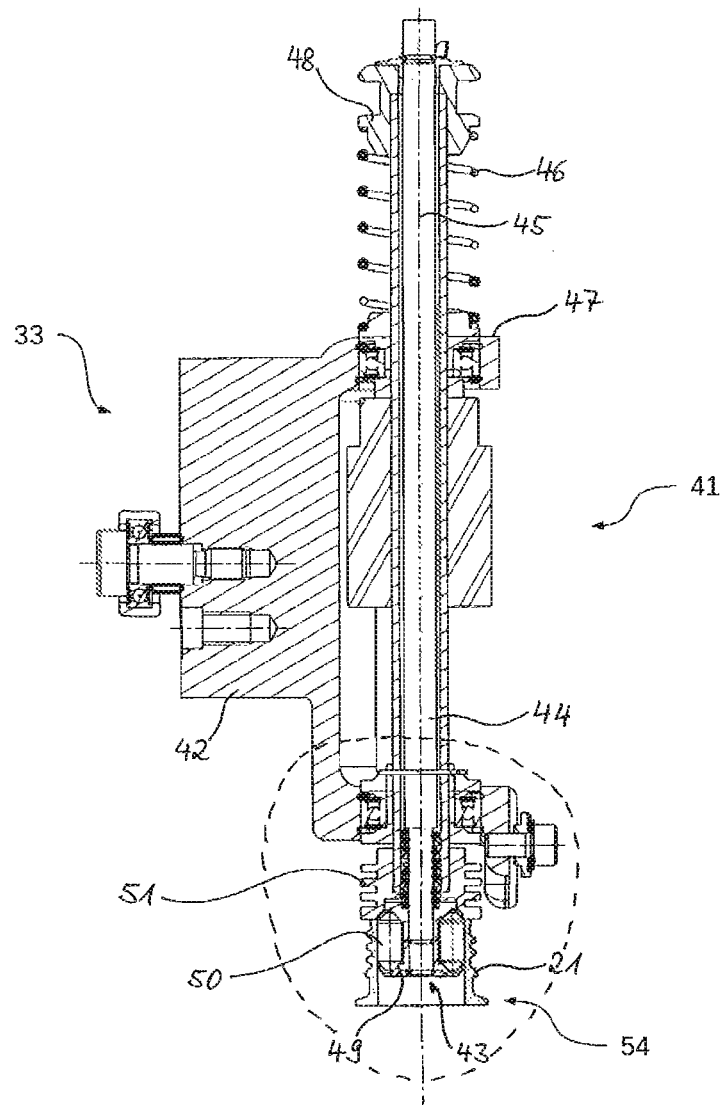
Figure 10:
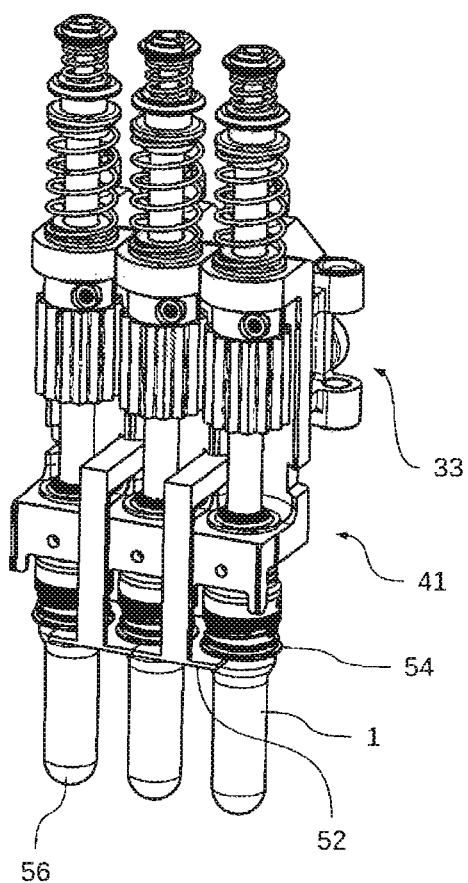
Figure 11:
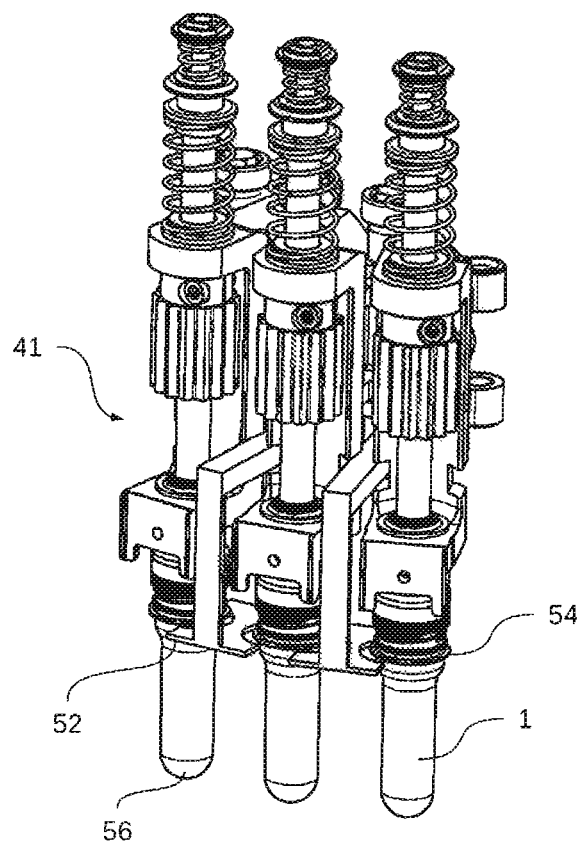
Figure 12:
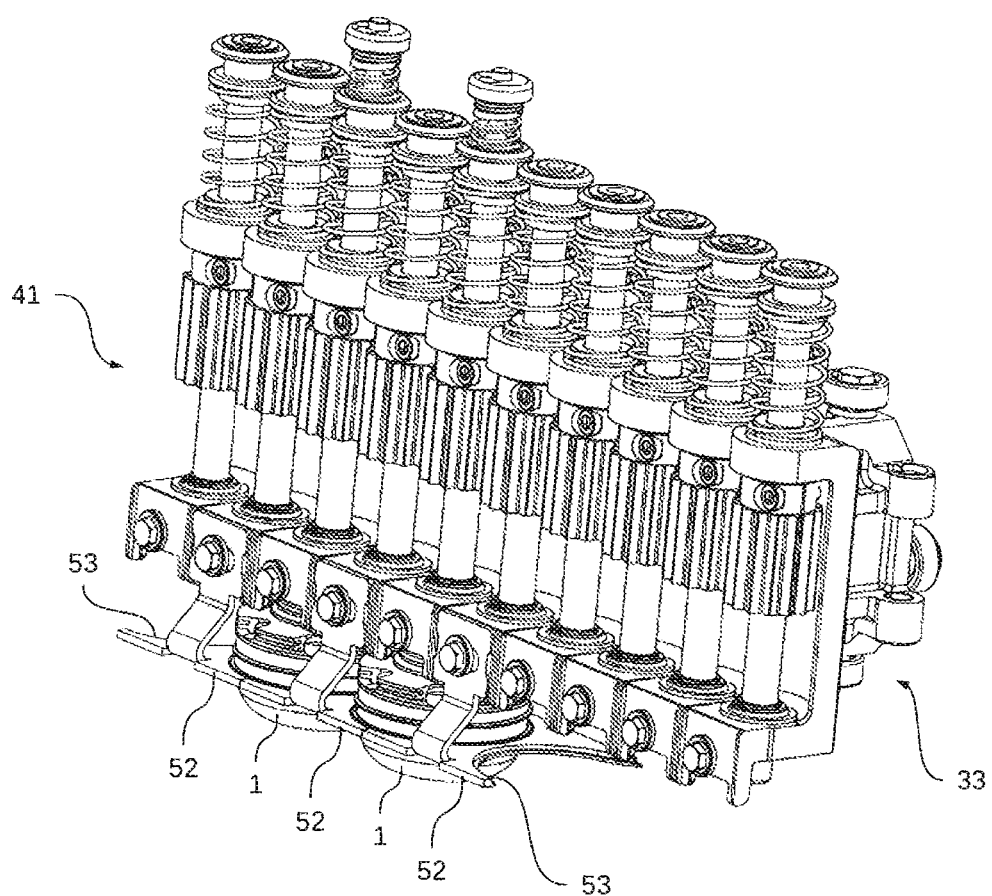
Figure 13:
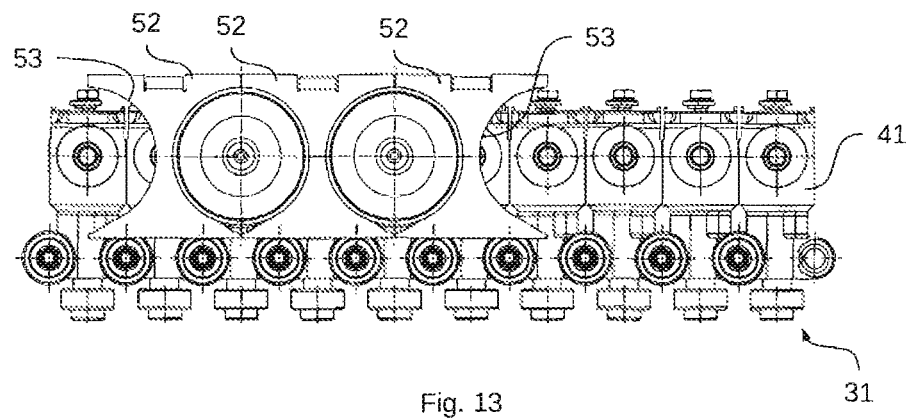
Figure 14:
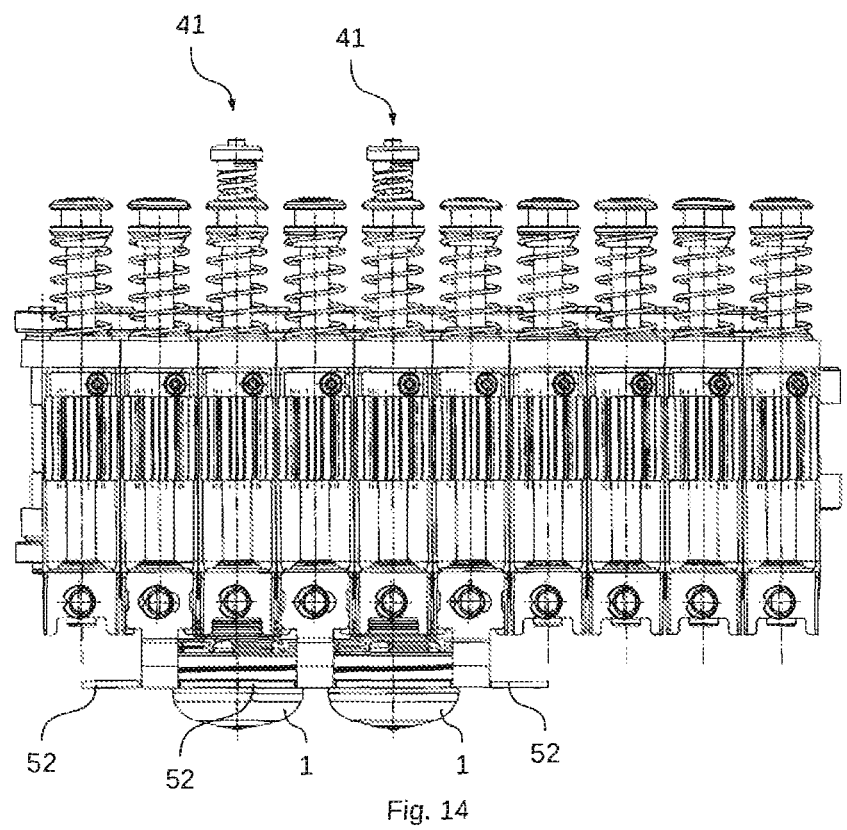
Figure 15:
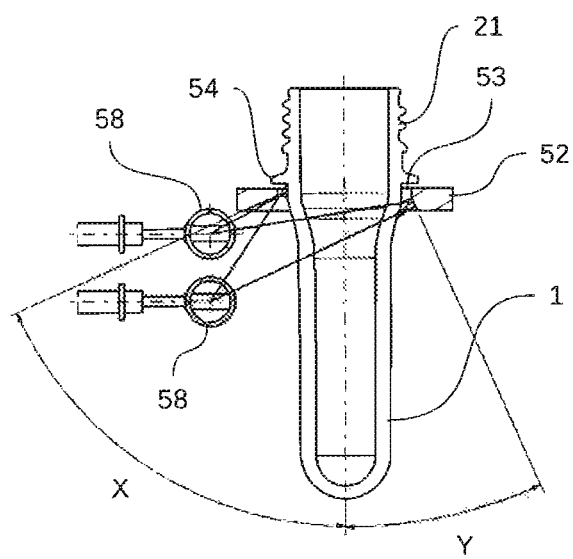

Exemplary embodiments of the invention are schematically illustrated in the drawings. In the figures:

FIG. 1 shows a perspective illustration of a blowing station for producing containers from preforms, FIG. 2 shows a longitudinal section through a blowmold, in which a preform is stretched and expanded, FIG. 3 shows a sketch to illustrate a fundamental structure of a device for blowmolding of containers, FIG. 4 shows a modified heating section having increased heating capacity, FIG. 5 shows a side view of a handling means formed as a transportation mandrel, FIG. 6 shows a section through the handling means from FIG. 5 along section line 6-6, FIGS. 7 to 11 show a portion of a conveyor chain having radiation screens according to the invention according to a first exemplary embodiment, FIGS. 12 to 14 show a portion of a conveyor chain having radiation screens according to the invention according to a second exemplary embodiment, and FIG. 15 shows a schematic sectional illustration of a preform in the transportation direction through a heating region of the heating device having a radiation screen partially enclosing the preform.

The fundamental structure of a device for forming preforms 1 into containers 2 is shown in FIG. 1 and FIG. 2. The arrangement can be as shown in this case or can be performed rotated by 180° in a vertical plane.

The device for forming the containers 2 substantially consists of a blowing station 3, which is provided with a blowmold 4, into which a preform 1 is insertable. The preform 1 can be an injection-molded part made of polyethylene terephthalate. To enable an insertion of the preform 1 into the blowmold 4 and to enable a removal of the finished container 2, the blowmold 4 consists of mold halves 5, 6 and a bottom part 7, which is positionable by a lifting device 8. The preform 1 can be fixed in the region of the blowing station 3 by a holding element 9. This holding element 9 can be designed according to the invention or as known in the prior art, for example. It is possible, for example, to insert the preform 1 via tongs or other handling means directly into the blowmold 4. To enable a compressed air feed line, a connection piston 10 is arranged below the blowmold 4, which feeds compressed air to the preform 1 and simultaneously performs sealing. In a modified design, however, it is also fundamentally conceivable to use fixed compressed air feed lines.

Stretching of the preform 1 takes place in this exemplary embodiment with the aid of a stretching rod 11, which is positioned by a cylinder 12. According to another embodiment, a mechanical positioning of the stretching rod 11 is carried out via curve segments, to which pickup rollers are applied. The use of curve segments is expedient in particular if multiple blowing stations 3 are arranged on a rotating blowing wheel 25.

In the embodiment illustrated in FIG. 1, the stretching system is designed such that a tandem arrangement of two cylinders 12 is provided. The stretching rod 11 is firstly moved by a primary cylinder 13 before beginning the actual stretching procedure up into the region of a bottom 14 of the preform 1. During the actual stretching procedure, the primary cylinder 13 with extended stretching rod is positioned jointly with a carriage 15 bearing the primary cylinder 13 by a secondary cylinder 16 or via a curve controller. In particular, the intention is to use the secondary cylinder 16 in a curve-controlled manner such that a present stretching position is specified by a guide roller 17 which slides along a curved path while the stretching procedure is carried out. The guide roller 17 is pressed against the guide path by the secondary cylinder 16. The carriage 15 slides along two guide elements 18.

After closing of the mold halves 5, 6 arranged in the region of carriers 19, 20, locking of the carriers 19, 20 in relation to one another is performed with the aid of a locking unit 40. The use of separate threaded inserts 22 in the region of the blowmold 4 is provided for adaptation to different shapes of an orifice portion 21 of the preform 1 according to FIG. 2.

FIG. 2, in addition to the inflated container 2, shows the preform 1 (shown by dashed lines) and schematically shows a developing container bubble 23.

FIG. 3 shows the fundamental structure of a blowmolding machine, which is provided with a heating section 24 and a rotating blowing wheel 25. Proceeding from a preform input 26, the preforms 1 are transported by transfer wheels 27, 28, 29 into the region of the heating section 24. Thermal radiators 30 as heating units and fans 31 are arranged along the heating section 24, in order to temperature control the preforms 1. After a sufficient temperature control of the preforms 1, they are transferred by a transfer wheel 35 to the blowing wheel 25, in the region of which the blowing stations 3 are arranged. The finished inflated containers 2 are supplied by further transfer wheels 37, 28, 38 to an output section 32. The transfer wheel 37 is formed in this case as a removal wheel and the transfer wheel 38 as an output wheel.

To be able to form a preform 1 into a container 2 such that the container 2 has material properties which ensure a long usage capability of foods filled inside the container 2, in particular beverages, special method steps have to be maintained during the heating and orientation of the preforms 1. In addition, advantageous effects can be achieved by maintaining special dimensioning guidelines. Different plastics can be used as the thermoplastic material. PET (polyethylene terephthalate), PEN (polyethylene naphthalate), or PP (polypropylene), for example, are suitable for use.

The expansion of the preform 1 during the orientation procedure is carried out by compressed air supply. The compressed air supply is divided into a pre-blowing phase, in which gas, for example, compressed air, is supplied at a low pressure level, and a subsequent main blowing phase, in which gas is supplied at a higher pressure level. During the pre-blowing phase, compressed air having a pressure in the interval from 10 bar to 25 bar is typically used, and during the main blowing phase, compressed air having a pressure in the interval from 25 bar to 40 bar is supplied.

It is also recognizable from FIG. 3 that in the illustrated embodiment, the heating section 24 is part of the transportation path of the preforms 1. The transportation of the preforms 1 takes place in the heating device H by means of a plurality of circulating transportation elements 33, which are concatenated like a chain and guided along deflection wheels 34, 36. The circulating transportation elements 33 thus move along a chain path 55, which also forms the transportation path of the preforms, since the preforms 1 are guided along the chain path 55. In particular, it is conceived that a substantially rectangular base contour be spanned by the chain-like arrangement of the transportation elements 33. In the illustrated embodiment, a single relatively large dimensioned deflection wheel 34 is used in the region of the extension of the heating section 24 facing toward the transfer wheel 27 and two comparatively smaller dimensioned deflection wheels 36 are used in the region of adjacent deflections. However, arbitrary other guides are also conceivable in principle.

To enable the closest possible arrangement of the transfer wheel 27 and the blowing wheel 25 in relation to one another, the illustrated arrangement has proven to be particularly advantageous, since three deflection wheels 34, 36 are positioned in the region of the corresponding extension of the transportation path 55, respectively the smaller deflection wheels 36 in the region of the transition to the linear courses of the transportation path 55 and the larger deflection wheel 34 in the immediate transfer region to the transfer wheel 27 and to the blowing wheel 25. Alternatively to the use of chain-like transportation elements 33, for example, it is also possible to use a rotating heating wheel.

After completed blowing of the containers 2, they are guided by the transfer wheel 38 out of the region of the blowing stations 3 and transported to the output section 32.

In the modified heating device H illustrated in FIG. 4, a larger quantity of preforms 1 can be temperature-controlled per unit of time by the larger number of thermal radiators 30. The fans 31 introduce cooling air here in the region of cooling air ducts 39, which are each opposite to the associated thermal radiators 30 and emit the cooling air via outflow openings. A flow direction for the cooling air substantially transverse to a transportation direction of the preforms 1 is implemented by the arrangement of the outflow directions. The cooling air ducts 39 can provide counter reflectors for the thermal radiation in the region of surfaces opposite to the thermal radiators 30, it is also possible to implement cooling of the thermal radiators 30 via the emitted cooling air.

A transportation of the preforms 1 and the containers 2 through the blowmolding machine B can take place in different ways. According to one embodiment variant, the preforms are carried by transportation mandrels at least along a substantial part of the transportation path thereof. However, it is also possible to carry out a transportation of the preforms using tongs, which engage on the outside on the preform, or to use inner mandrels, which are inserted into an orifice region of the preform. Different variants are also conceivable with respect to the spatial orientation of the preforms.

According to one variant, the preform is supplied having its orifice oriented in the vertical direction upward in the region of the preform input 26, subsequently rotated, conveyed along the heating section 24 and the blowing wheel 25 with its orifice oriented in the vertical direction downward, and rotated again before reaching the output section 32. According to another variant, the preform 2 is heated in the region of the heating section 24 with its orifice oriented downward in the vertical direction, but is rotated by 180° again before reaching the blowing wheel 25.

According to a third embodiment variant, the preform passes through the entire region of the blowmolding machine B without carrying out turning procedures with its orifice oriented upward in the vertical direction.

FIG. 5 shows a partial illustration of a side view of a preform 1, into the orifice region 21 of which a holding device 41 known from the prior art is inserted in some regions. This holding device 41 is, together with the transportation element 33, an example of a transportation and handling means in the meaning of the patent claims. In each of schematic FIGS. 3 and 4, only the reference sign 33 is indicated for the transportation elements connected like a chain.

The holding device 41 shown by way of example has an element base 42, a head 43 facing toward the preform 1, and a shaft 44 connected to the head 43. The shaft 44 having the head 43 is movable in relation to the element base 42 in the direction of an element longitudinal axis 45. A main position of the shaft 44 in relation to the element base 42 can be specified by a spring 46. The spring 46 is arranged in the illustrated exemplary embodiment between an upper side 47 of the element base 42 and an end segment 48 protruding laterally beyond the shaft 44.

According to one typical exemplary embodiment, a plurality of element bases 42 can be connected to one another like a chain or can be connected to a circulating transportation chain. An arrangement thus results as shown in FIGS. 3 and 4. The holding device 41 can also be attached, however, to circulating transfer wheels or other units. Positioning of the shaft 44 in relation to the element base 42 also takes place in a curve-controlled manner according to one typical exemplary embodiment, via a curve which extends at least in some portions along a transportation path of the carrying element 41.

FIG. 6 shows, in a longitudinal section, the positioning of the head 43 inside an orifice portion 21 of a preform 1 or a container 2. It can be seen that the head 43 has depressions 49, in which clamping elements 50 are arranged. Outside the region insertable into the orifice portion 21, the head 43 can have a cooling body 51, which is provided with cooling ribs for thermal emission.

FIGS. 7-11 show a first exemplary embodiment of transportation means 33 and handling means 41 according to the invention having preforms 1 held on the handling means 41. The transportation means 33 are formed in the present example as chain links, which are linked to one another on the rear side by means of axes of rotation so they are pivotable. In the present case, only a part of the transportation chain formed by means of the chain links is shown for reasons of comprehensibility. The handling means 41 held on the transportation means 33 formed as chain links are formed here as transportation mandrels. The transportation mandrels can be designed according to the explanations of FIGS. 5 and 6.

Figure 7:
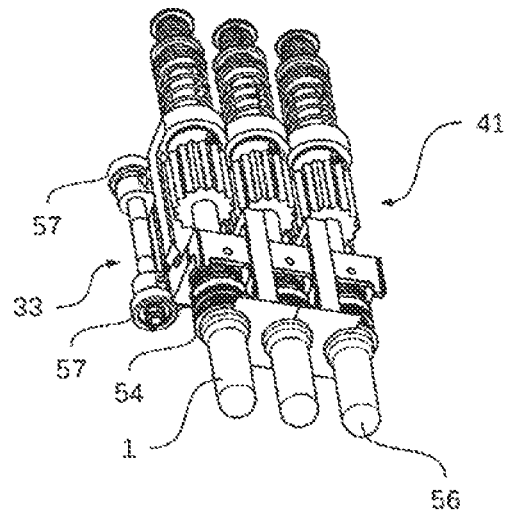

Three links 33, which each bear a transportation mandrel 41, are shown in particular in FIG. 7. According to the invention, radiation screens 52 are arranged in the intermediate space between two preforms 1 arranged in succession in the extension direction of the transportation chain. In the present case, the radiation screens 52 are formed plate-shaped. The radiation screens 52 are fastened using holding arms on the chain links 33, which lie in the rear in the plane of the drawing.

FIG. 7 shows the position of the chain links 33 with the holding mandrels 41 in the case of a linear routing of the transportation path 55. The recesses 53 of the radiation screens 52 enclose the preforms 1 over an angle range of 180° in this case.

Figure 8:
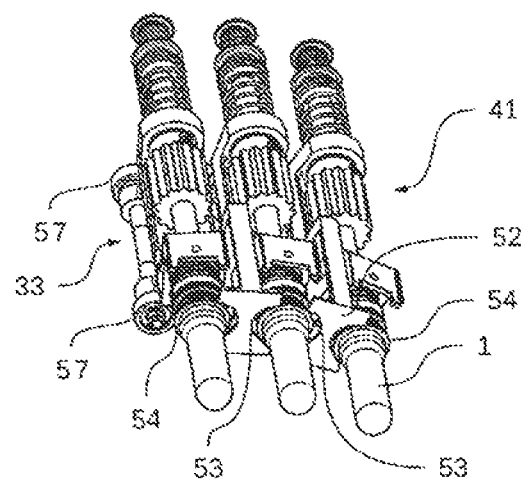

FIG. 8 shows the chain links from FIG. 7 when cornering. It can be clearly seen in FIG. 8 that during cornering, a lateral distance between the radiation screen 52 and the preforms 1 adjoining the radiation screen 52 is produced, and therefore the preforms 1 are displaceable downward by means of the transportation mandrels 41, as shown in FIG. 9, without the support ring 54 of the preforms colliding with the radiation screen 52.

FIG. 7 shows in particular that the radiation screen 52 having recesses 53 encloses the preforms 1 below the support rings 54. Thermal radiation acting on the preforms 1 below the support rings 54 can therefore be efficiently shielded from the support ring 54 and the orifice portion 21 located above it. As shown, the preforms are enclosed below the support rings 54 thereof over an angle range of 180°, and therefore a small-gap shielding of the regions above the support rings 54 is enabled by means of the radiation screens.

FIGS. 10 and 11 show the transportation chain parts 33 from FIGS. 7 and 8, respectively, in a changed perspective to better illustrate the radiation screen position during a linear chain guiding and a curved guiding.

Figure 9:
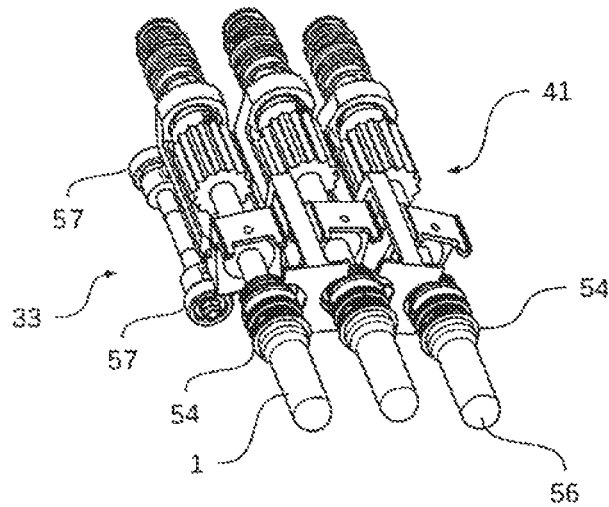

In the perspective illustrations of FIGS. 7, 8, and 9, control rollers 57 are recognizable, which interact with a control curve (not shown) of the heating device H to guide the transportation means 33. The movement path of the transportation mandrels 41 and the preforms 1 held thereon along the transportation path 55 is determined by means of the control rollers 57.

FIGS. 12-14 show a further exemplary embodiment of transportation means 33 according to the invention having handling means 41 borne thereon. In contrast to the embodiment of FIGS. 7-11, the radiation screens 52 are fastened directly on the transportation mandrels 41. The radiation screens 52 are each held immovable via a holding arm on the front side on the transportation mandrels 41. The radiation screens 52 are preferably detachably fastened on the transportation mandrels, to enable a simple replacement. FIG. 12 is a perspective view of successively arranged transportation mandrels 41 in the case of a linear guide. Radiation screens 52 held on the transportation mandrels 41 and recesses 53 incorporated into the radiation screens 52 can be clearly seen. FIG. 13 is a horizontal projection of the transportation mandrels 41 with the radiation screens 53 from FIG. 12 from below. FIG. 14 is a side view of the transportation mandrels 41 having the radiation screens 53 from FIG. 12 with a view of the front side of the transportation mandrels 41.

As a transportation mandrel 41 pivots away during cornering of the transportation means 33, a transportation mandrel 41 is pivoted away from its following transportation mandrel 41 in the transportation direction. A radiation screen 52 fastened on the pivoting-away transportation mandrel 41 is moved away in a positively guided manner from the following preform 1 in this case. The radiation screen 52 is located in an open position. A gap arises in this case between radiation screen 52 and preform 1, which can be used for the undisturbed guiding out of the preform downward. Similarly, the gap resulting during cornering can be used to receive a preform 1.

In the case of a linear guide adjoining the cornering, the opening of two successive radiation screens 52 achieved during the cornering is closed again, and therefore a preform located between the radiation screens 52 is overlapped below its support ring 54 by the recesses 53 facing toward one another. The radiation screen 52 is located in a closed position. During the traversal of a heating tunnel, effective shielding of the support rings 54 and the orifice portions 21 located above the support rings 54 can be achieved in the closed position.

In the exemplary embodiment from FIGS. 12-14, only every second transportation mandrel 41 is used for handling a preform 1. The transportation mandrels 41 between the transportation mandrels 41 provided for handling preforms 1 are used to hold the radiation screens 52. These empty mandrels are space holders, without the function of handling preforms being assigned thereto. In a modification, it can also be provided that two or more than two transportation mandrels 41 as empty mandrels or chain links 33 as empty links without holding means are arranged between two transportation mandrels 41 provided for the handling of preforms 1.

As is recognizable in particular in the perspective view of FIG. 12 and the side view in FIG. 14, the diameter of the preforms 1 held on the transportation mandrels 41 with carrying function is greater than the width of the transportation mandrels 41. Two transportation mandrels 41 arranged adjacent to one another therefore cannot each be used for handling a preform 1.

FIG. 15 is a sectional illustration with a view in the transportation direction of a preform 1 shown in the foreground and a radiation screen 52 according to the invention, which encloses the preform 1 shown in the background below the support ring 54. The radiation screen 52 overlaps with the support ring 54 on the preform body side according to the invention.

In this exemplary embodiment of the radiation screen 52 according to the invention, it is provided that the recess 53 has a chamfer on the side of the preform body having an asymmetrical slope profile.

Thermal radiators 58 are shown solely schematically in a sectional illustration laterally of the preform. The thermal radiators 58 can be part of a heating box (not shown), which is well known from the prior art, on which no further statements are to be made at this point.

The angle ranges X and Y recognizable in FIG. 15 each show an angle of the chamfer along the edge region of the recess 53 on the preform body side in relation to the longitudinal axis of the preform 1. It is clearly recognizable that the chamfer angle Y on the side of the preform 1 opposite to the thermal radiators 58 is less than the chamfer angle X on the side of the preform 1 facing toward the thermal radiators 58.

An asymmetrical chamfer profile of the recess 53 arises due to the chamfer angle, which changes over the course of the edge region. On the side opposite to the thermal radiators 58, the chamfer is incorporated with greater steepness in the edge region of the recess 53. The thermal radiation emitted by the thermal radiators 58 passes through the preform 1, is incident on the steep chamfer face of the recess 53, and is advantageously reflected back in the wall region of the preform 1 directly below the support ring 54. Using the suitable selection of the angle Y, the formation of the temperature profile directly below the support ring 54 can advantageously be influenced as needed.

The particularly flatly extending chamfer having the angle X on the side of the preform 1 facing toward the thermal radiators 58 ensures a targeted transmission of thermal radiation otherwise masked using the radiation screen 52 in the wall region of the preform 1 directly below the support ring 54, whereby the temperature profile in this region can also advantageously be influenced if needed.

LIST OF REFERENCE SIGNS 1 preform
2 container
3 blowing station
4 blowmold
5 first mold half
6 second mold half
7 bottom part
8 lifting device
9 holding element
10 connection piston
11 stretching rod
12 cylinder
13 primary cylinder
14 bottom
15 carriage
16 secondary cylinder
17 guide roller
18 guide element
19 first carrier
20 second carrier
1 preform
2 container
3 blowing station
4 blowmold
5 first mold half
6 second mold half
7 bottom part
8 lifting device
9 holding element
10 connection piston
11 stretching rod
12 cylinder
13 primary cylinder
14 bottom
15 carriage
16 secondary cylinder
17 guide roller
18 guide element
19 first carrier
20 second carrier
21 orifice portion
22 threaded insert
23 container bubble
24 heating section
25 blowing wheel
26 preform input
27 transfer wheel
28 transfer wheel
29 transfer wheel
30 thermal radiator
31 fan
32 output section
33 transportation means
34 deflection wheel
35 transfer wheel
36 deflection wheel
37 transfer wheel
38 transfer wheel
39 cooling air duct
40 locking unit
41 holding device
42 element base
43 head of the holding device
44 shaft
45 longitudinal axis
46 spring
47 upper side of the element base
48 end segment
49 depressions
50 clamping elements
51 cooling body
52 radiation screen
53 recess in the radiation screen
54 support ring
55 transportation path
56 bottom section
57 control roller
58 thermal radiator
B blowing station
H heating device

The invention claimed is:

1. A heating device for thermally conditioning preforms to a temperature profile suitable for blow molding, said preforms being made of thermoplastic material and having an upper orifice portion defining an opening, a collar-like support ring arranged below the orifice portion, and a bottom portion closed at a lower end, said heating device comprising:
a heating section;
transportation means for transporting the preforms along a transportation path through the heating section; and
a plurality of handling means carried by the transportation means, each of said handling means being configured to hold and handle one of the preforms;
wherein a radiation screen is provided in an intermediate space between adjacent handling means,
wherein the radiation screen follows the transportation path of the preforms through the heating section,
wherein the radiation screen has a recess at least on one end face for partially enclosing a preform held in one of the adjacent handling means such that a surface of the radiation screen, as viewed in a longitudinal direction of the preform, at least temporarily overlaps a surface of the support ring of the preform on a side facing away from the orifice portion during transportation of the preform along the transportation path of the heating device, and
wherein the handling means are transportation mandrels.

2. The heating device as claimed in claim 1, wherein the radiation screen is movable between an open position which laterally releases the support ring and a closed position engaging below the support ring.

3. The heating device as claimed in claim 1, wherein the radiation screen is vertically adjustable.

4. The heating device as claimed in claim 1, wherein the surface of the radiation screen is a heat radiation reflecting surface.

5. The heating device as claimed in claim 1, wherein the heating device further comprises a cooling unit for applying a cooling gas to the radiation screen.

6. The heating device as claimed in claim 1, wherein the radiation screen further comprises a second recess for partially enclosing a preform held in another of the adjacent handling means.

7. The heating device as claimed in claim 1, wherein the recess is configured to enclose a preform over an angle range of 160° to 180°.

8. The heating device as claimed in claim 1, wherein the radiation screen is mounted on the handling means.

9. The heating device as claimed in claim 1, wherein an edge region on a preform body side of the recess has a chamfer, and wherein a slope of the chamfer varies over along a course of the edge region.

10. The heating device as claimed in claim 1, wherein the transportation mandrels each have a carrying head for fixing a preform in the orifice portion.

11. The heating device as claimed in claim 10, wherein the carrying heads are arranged in a vertical direction in a lower end region of the transportation mandrels.

12. A blow molding machine comprising a heating device as claimed in claim 1.

13. The heating device as claimed in claim 1, wherein the radiation screen is mounted on the transportation means.

14. The heating device as claimed in claim 11, wherein the carrying heads are configured to engage into the orifice portion of the preform and fix the preform in a clamping manner.

* * * * *